United States Patent [19]
Ko

[11] Patent Number: 5,293,234
[45] Date of Patent: Mar. 8, 1994

[54] GHOST CANCELLING APPARATUS HAVING TRANSVERSAL FILTER FOR GENERATING GHOST CANCELLING SIGNAL AND METHOD THEREOF

[75] Inventor: Do Y. Ko, Anyang, Rep. of Korea

[73] Assignee: Samsung Electronics Co., Ltd., Kyungki, Rep. of Korea

[21] Appl. No.: 989,572

[22] Filed: Dec. 11, 1992

[30] Foreign Application Priority Data

Dec. 11, 1991 [KR] Rep. of Korea .................... 91-22621

[51] Int. Cl.⁵ ............................................. H04N 5/21
[52] U.S. Cl. .................................................. 348/614
[58] Field of Search ................ 358/167, 166, 905, 36, 358/37; 364/724.16; H04N 5/21

[56] References Cited

U.S. PATENT DOCUMENTS

| | | | |
|---|---|---|---|
| 4,896,213 | 1/1990 | Kobo | 358/167 |
| 4,947,252 | 8/1990 | Kobayashi | 358/36 |
| 5,025,317 | 6/1991 | Koguchi | 358/167 |
| 5,045,945 | 9/1991 | Herman | 358/167 |
| 5,130,799 | 7/1992 | Iga | 358/167 |
| 5,184,221 | 2/1993 | Nishi | 358/167 |
| 5,196,936 | 3/1993 | Kobayashi | 358/167 |
| 5,216,507 | 6/1993 | Ito | 358/167 |
| 5,237,415 | 8/1993 | Koguchi | 358/167 |

FOREIGN PATENT DOCUMENTS

| | | | |
|---|---|---|---|
| 0134584 | 10/1980 | Japan | 358/905 |
| 0197971 | 12/1982 | Japan | 358/167 |
| 0114979 | 7/1984 | Japan | 358/167 |
| 0219077 | 12/1984 | Japan | 358/167 |
| 0120965 | 5/1991 | Japan | H04N 5/21 |
| 0253177 | 11/1991 | Japan | H04N 5/21 |

Primary Examiner—James J. Groody
Assistant Examiner—Chris Grant
Attorney, Agent, or Firm—Sughrue, Mion, Zinn, Macpeak & Seas

[57] ABSTRACT

A ghost cancelling apparatus and method for quickly and sufficiently cancelling a ghost in a video signal, particularly a spread ghost, include performing a cross-correlation operation between the output video signal and a ghost cancelling reference signal, and correcting a filter coefficient based on the cross-correlation operation result when a remaining ghost is not less than a predetermined value, while when the remaining ghost is less than a certain value, the filter coefficient is corrected according to a least mean square method.

4 Claims, 2 Drawing Sheets

GHOST CANCELLING APPARATUS HAVING TRANSVERSAL FILTER FOR GENERATING GHOST CANCELLING SIGNAL AND METHOD THEREOF

BACKGROUND OF THE INVENTION

The present invention relates to a ghost cancelling apparatus and method for a television video signal, and more particularly, to an apparatus and method for automatically canceling a ghost within an input video signal using a transversal filter.

When a television signal is transmitted via a channel, the television signal includes a ghost signal as a result of multi-paths which are formed when the television video signal is reflected by a large object such as a building, etc. Such a ghost signal is received after being delayed in time in comparison with the original signal due to the difference in lengths of the signal paths. When the television signal is reproduced in a receiver, the ghost signal, having a smaller amplitude than that of the original signal, is displayed on a screen as a dark image which is offset from the image of the original signal.

To eradicate the unwanted ghost signal from the received signal, various ghost signal cancelling techniques have been proposed. However, such conventional ghost signal cancelling techniques utilize a common principle, in which the original signal is delayed so as to match the ghost signal in time, and the amplitude of the original signal is attenuated so to match that of the ghost signal. The attenuated and delayed original signal, that is, a ghost correction signal, is then provided to cancel the ghost signal.

A basic step of effectively cancelling a ghost signal within an input video signal, is a step of correctly extracting the existence of the ghost component in the input signal, that is, relative to its magnitude and location. In order to provide this correction step, the television signal transmission station transmits a ghost cancelling reference signal (GCR) a predetermined time before transmitting the video signal, and the receiver compares the received signal distorted during transmission with a signal corresponding to the reference signal in order to detect the location and magnitude of the ghost.

Conventionally, the cross-correlation is performed between the initially received video signal and a reference signal GCR. Using the result of the cross-correlation, the location and magnitude of the ghost are extracted and the filter coefficient is initialized. Thereafter, the filter coefficient is corrected according to the conventional least mean square (LMS) algorithm which is based on the difference between the output y(n) and the reference signal r(n), that is, error signal e(n), thereby obtaining an optimal filter coefficient to cancel the ghost. A system for performing this conventional method is shown in FIG. 1 and includes an error signal detector 3 for providing the error signal e(n), a LMS filter coefficient corrector 4 for receiving the error signal e(n), a transversal filter 2 which receives the output of the corrector 4 and a subtractor 1 for receiving input signal x(n) and the output of filter 2.

However, in the conventional ghost cancelling method, when the input signal includes a spread ghost due to multiple ghosts each having nearly the same delay time as shown in FIG. 2A, the spread ghost is recognized as a single ghost to be processed. Accordingly, it takes a long time to remove the ghost, and further, it is difficult to sufficiently remove the ghost. That is, when the spread ghost exists as shown in FIG. 2A, only that ghost having the maximum peak value is recognized, and therefore the spread ghost is detected as a single ghost as shown in FIG. 2B. As a result, the remainder of the ghost above the threshold value as shown in FIG. 2C, still exists in the output even after the ghost has been removed from the input signal as described above. When such a remaining ghost above the threshold value is supposed to be removed by repeatedly correcting the filter coefficient using an LMS algorithm based on an error signal between the output signal and a reference signal according to the conventional ghost cancelling method, it takes too much time and results in insufficient removal of the ghost.

SUMMARY OF THE INVENTION

Therefore, to solve the above problems, it is an object of the present invention to provide a ghost cancelling apparatus and method for more quickly and sufficiently or effectively cancelling a spread ghost in an input signal.

The ghost cancelling apparatus and method according to the present invention is based on a principle in which each cross-correlation function between an output signal and a reference signal is obtained, rather than setting a filter coefficient as a cross-correlation function between an input signal and a reference signal as in the conventional method, and the filter coefficient according to the cross-correlation operation output is updated when the value of the cross-correlation function is not less than a predetermined threshold value, that is, the remaining ghost is not less than a predetermined magnitude or threshold, while the filter coefficient is obtained according to a known LMS algorithm when the remaining ghost is not more than the predetermined magnitude, thereby quickly and effectively cancelling the ghost, particularly the remaining ghost due to the spread ghost.

Thus, to accomplish the above object of the invention, there is provided a ghost cancelling apparatus comprising: a first filter coefficient corrector for generating a filter coefficient correction signal based on an error signal between an output video signal and a ghost cancelling reference signal; a cross-correlation operation portion for performing a cross-correlation operation between the output video signal and the ghost cancelling reference signal; a remaining ghost detector for detecting remaining ghost information which is not less than a predetermined threshold value in the output video signal based on a cross-correlation output of the cross-correlation operation portion; a second filter coefficient corrector for generating a filter coefficient correction signal of a transversal filter based on the detected remaining ghost information; and a switching portion which operates such that when the correction signal is supplied from the second filter coefficient corrector, the corrected signal is supplied to the transversal filter, while when the correction signal from the second filter coefficient corrector is not supplied, the correction signal from the first filter coefficient corrector is supplied to the transversal filter.

Also, a ghost cancelling method according to the present invention comprises the steps of: detecting an error signal between an output video signal and a ghost cancelling reference signal; generating a correction signal for updating a transversal filter coefficient based on the error signal; performing a cross-correlation operation between the output video signal and the ghost cancelling reference signal; detecting remaining ghost information which is not less than a predetermined threshold value based on a cross-correlation output; generating a correction signal for updating a transversal filter coefficient based on the detected remaining ghost information; and when the correction signal based on the detected remaining ghost information exists, supplying the correction signal based on the remaining ghost information to the transversal filter, while when the correction signal based on the remaining ghost information does not exist, supplying a correction signal based on the error signal to the transversal filter.

DETAILED DESCRIPTION OF THE PREFERRED EMBODIMENT

A preferred embodiment of the present invention will be described below in more detail with reference to the accompanying drawings.

Figure 1:
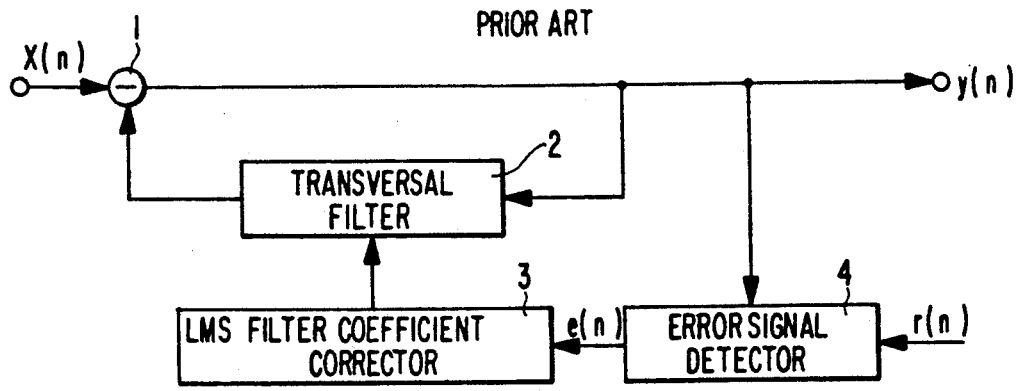
FIG. 1 is a block diagram of a conventional ghost cancelling apparatus.
Figure 3:
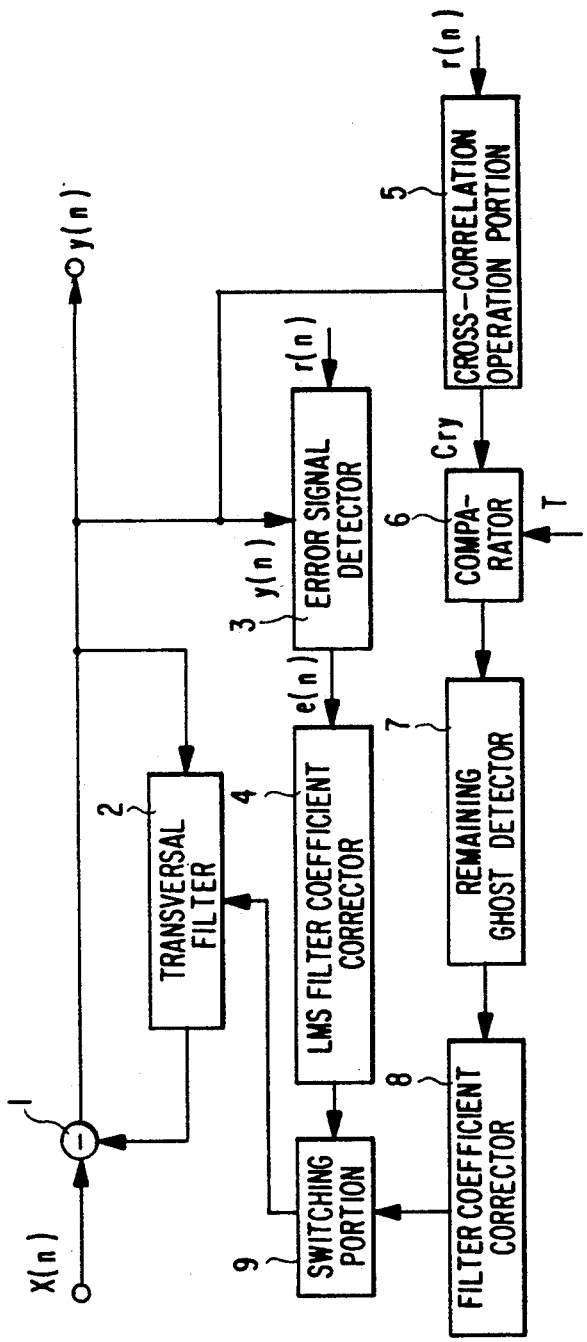
FIG. 3 is a block diagram of a ghost cancelling apparatus according to an embodiment of the present invention.

In FIG. 3, a ghost cancelling apparatus according to the preferred embodiment includes a construction of the conventional ghost cancelling apparatus shown in FIG. 1. Those elements of FIG. 3 which are identical to those shown in FIG. 1 have identical reference symbols.

Referring to FIG. 3, an input signal x(n) is input to subtractor in which a ghost cancelling signal supplied from transversal filter 2 is mixed with the input signal x(n), and subtractor 1 outputs a ghost-cancelled signal y(n). On the other hand, ghost-cancelled signal y(n) is input to an error signal detector 3 and to a cross-correlation operator 5. The error detector 3 subtracts a reference signal r(n) from signal y(n), to thereby output an error signal e(n). A LMS filter coefficient corrector 4 generates a filter coefficient correction signal for updating a filter coefficient of transversal filter 2 based on the error signal e(n). The filter coefficient correction signal is input to a switching portion 9.

On the other hand, cross-correlation operator 5 performs a cross-correlation operation of the received output signal y(n) and reference signal r(n), to output cross-correlation output Cry. A comparator 6 compares the cross-correlation output Cry with a predetermined threshold value T. A remaining ghost detector 7 detects the magnitude and location of the remaining ghost corresponding to the cross-correlation output Cry when the cross-correlation output Cry is larger than the predetermined threshold value T. Thus, when cross-correlation output Cry is smaller than the threshold value T, that is, the remaining ghost is smaller in magnitude than the predetermined threshold value T, the remaining ghost detector 7 does not provide an output.

A filter coefficient corrector 8 generates a filter coefficient correction signal based on the ghost information output by the remaining ghost detector 7. This filter coefficient correction signal is input to switching portion 9 to which another filter coefficient correction signal from LMS filter coefficient corrector 7 is input. At this time, when the output signal of filter coefficient corrector 8 does exist, switching portion 9 selects the output of filter coefficient corrector 8, while when there is no output by filter coefficient corrector 8, then switching portion 9 selects the output of LMS filter coefficient corrector 4.

Figure 2A:
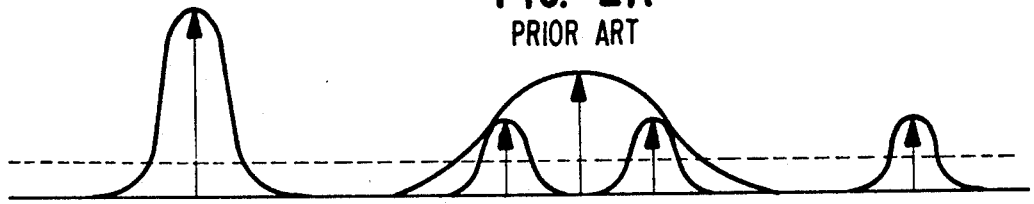
FIG. 2A is a waveform diagram for explaining a cross-correlation operation between an input video signal having a spread ghost and a reference signal in a conventional ghost detection and cancelling state.
Figure 2B:
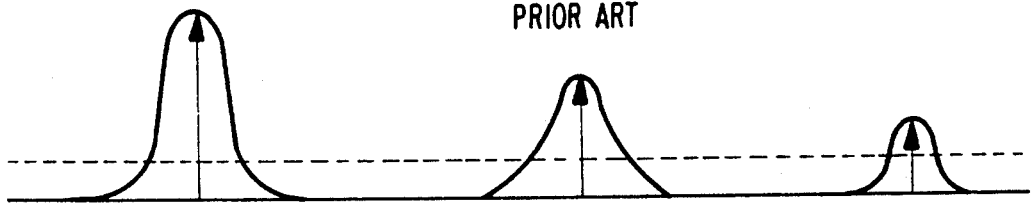
FIG. 2B is a waveform diagram for representing a ghost detected from the waveform shown in FIG. 2A.

According to the above construction, input video signal x(n) including the spread ghost component as shown in FIG. 2A is output by subtractor 1 as ghost-cancelled signal y(n) by means of the ghost cancelling signal supplied from transversal filter 2. The output signal y(n) is a signal from which only the main ghost is cancelled as described above in connection with the conventional techniques, and includes the remaining ghost not less than the threshold value shown in FIG. 2C.

The output signal y(n) is input to cross-correlation operator 5 which performs a cross-correlation operation of the output signal with the reference signal r(n). The result of the cross-correlation operation includes information indicating the location and magnitude of the remaining ghost. The comparator 6 compares the output of the cross-correlation operator 5 with a predetermined threshold value. As a result of this comparison, if it is determined that there exists the remaining ghost not less than the threshold value, the remaining ghost detector 7 detects the specific information of the remaining ghost. Thereafter, filter coefficient corrector 8 receives the specific information on the remaining ghost detected by detector 7 and generates the filter coefficient correction signal for the remaining ghost.

Thus, only when there exists within the output signal y(n) the remaining ghost not less than the threshold value is the filter coefficient correction signal generated based on the cross-correlation operation between the output and the reference signal. The filter coefficient of transversal filter 2 is updated by the generated correction signal. On the other hand, when any remaining ghost within the output signal is not more than the threshold value, then the filter coefficient correction signal is not generated based on the cross-correlation operation. Accordingly, in this case the switching portion 9 supplies the filter coefficient correction signal of the LMS filter coefficient corrector 4 which is based on error signal e(n) to the transversal filter 2.

Therefore, when the remaining ghost not less than the threshold value exists within the output signal, the filter coefficient is quickly updated by means of the cross-correlation operation, thereby quickly and sufficiently cancelling the remaining ghost due to the spread ghost. On the other hand, when the remaining ghost within the output signal is not more than the threshold value, the filter coefficient is updated using the general LMS algorithm as in the conventional systems.

Figure 2C:
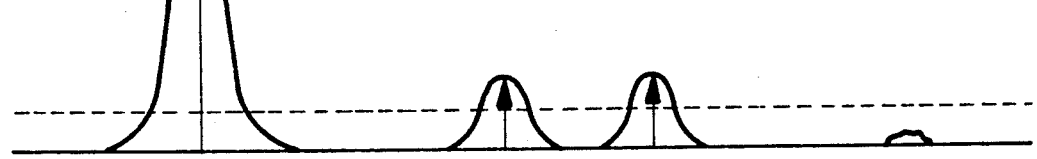
FIG. 2C is a waveform diagram showing a ghost cancelling state by means of the conventional ghost cancelling apparatus.
Figure 2D:
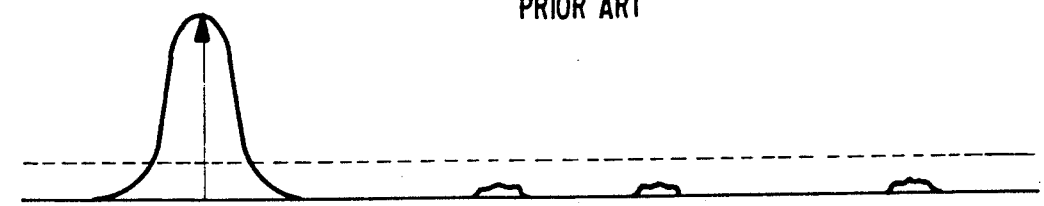
FIG. 2D is a waveform diagram showing a ghost cancelling state by means of a filter coefficient corrector according to the present invention.

As a result, the remaining ghost is cancelled by means of the filter coefficient correction based on the cross-correlation operation between the output and the reference signal as shown in FIG. 2C. The state of the ghost-cancelled video signal is shown in FIG. 2D. As indicated above, the remaining ghost not more than the threshold value is cancelled through the conventional LMS algorithm.

In the above-described embodiment and the attached drawings, the filter coefficient is quickly corrected based on the cross-correlation operation between the output signal and the reference signal. However, to obtain the same effect, the output signal and the reference signal can be respectively differentiated. Then, the difference between the differentiated signals is detected, from which the existence, the location and size of the remaining ghost can be determined in order to generate the filter coefficient correction signal.

As described above, the present invention can adaptively update the filter coefficient according to the cross-correlation operation between the output and reference signal or the result of subtraction of the respective differentiated values. Accordingly, the ghost, particularly the spread ghost can be quickly and sufficiently cancelled.

What is claimed is:

1. A ghost cancelling apparatus having a transversal filter for generating a ghost cancelling signal to cancel a ghost in an input video signal, thereby providing a ghost-cancelled output video signal, the apparatus comprising:
   a first filter coefficient corrector for generating a first filter coefficient correction signal based on an error signal between the ghost-cancelled output video signal and a ghost cancelling reference signal;
   a cross-correlation operation means for performing a cross-correlation operation between the ghost-cancelled output video signal and the ghost cancelling reference signal;
   a remaining ghost detector for detecting remaining ghost information that is not less than a predetermined threshold value in the ghost-cancelled output video signal in accordance with an output of said cross-correlation operation means;
   a second filter coefficient corrector for generating a second filter coefficient correction signal of said transversal filter based on the remaining ghost information detected by said remaining ghost detector; and
   switching means for supplying the second filter coefficient correction signal to said transversal filter when the second filter coefficient correction signal is generated by said second filter coefficient corrector, and for supplying the first filter coefficient signal to said transversal filter when the second correction coefficient signal is not generated from said second filter coefficient corrector.

2. The ghost cancelling apparatus according to claim 1, wherein said first filter corrector generates the first filter coefficient correction signal according to a least means square (LMS) operation.

3. A ghost cancelling method for cancelling a ghost within an input video signal using a transversal filter, thereby providing a ghost-cancelled output video signal, said method comprising the steps of:
   detecting an error signal between the ghost-cancelled output video signal and a ghost cancelling reference signal;
   generating a first correction signal for correcting a transversal filter coefficient based on the error signal;
   performing a cross-correlation operation between the ghost-cancelled output video signal and the ghost cancelling reference signal;
   detecting remaining ghost information that is not less than a predetermined threshold value based on the performed cross-correlation operation;
   generating a second correction signal for correcting the transversal filter coefficient based on the detected remaining information; and
   when remaining ghost information is detected according to said detecting remaining ghost information step, supplying the second correction signal based on the remaining ghost information to the transversal filter, while when the remaining ghost information is not detected according to said detecting remaining ghost information step, supplying the first correction signal to the transversal filter.

4. The ghost cancelling method according to claim 3, wherein said step of generating the first correction signal in accordance with at least mean square method.

* * * * *